United States Patent

Frerson et al.

[15] 3,640,621
[45] Feb. 8, 1972

[54] VIEWER-PROJECTOR-COPIER APPARATUS FOR MICROFORMS

[72] Inventors: Raymond Frerson, St. Germain-les-Arpajon; Claude Gravier, Verrieres-le-Buisson; Pierre Ravenel, Clamart; Pierre Soupene, Chatillon-sur-Bagneux, all of France

[73] Assignee: Electricite de France (Service National), Paris, France

[22] Filed: Mar. 23, 1970

[21] Appl. No.: 21,716

[30] Foreign Application Priority Data

Mar. 24, 1969 France..................................6908520

[52] U.S. Cl.................................................355/45, 353/77
[51] Int. Cl.........................................................G03b 27/70
[58] Field of Search..............................355/45, 46; 353/77

[56] References Cited

UNITED STATES PATENTS 3,463,585  8/1969  Levine......................................355/45
3,315,561  4/1967  Boutigue..............................355/45 X

*Primary Examiner*—Samuel S. Matthews
*Assistant Examiner*—Richard A. Wintercorn
*Attorney*—Young & Thompson

[57] ABSTRACT

A microform viewer-projector-copier is provided with a light source providing a conical beam of light, a diffusion plate and a double Fresnel lens system to homogenize and concentrate the beam on a nodal plane. The microform, preferably of the type which includes at least one and up to 128 microimages, is mounted in a holder which is movable along the axis of the light beam and provided with means for positioning the microimages to be illuminated by the light beam. A plurality of lens systems are mounted on a turret for positioning in the nodal plane any one of them to focus the image of the illuminated portion of the microform onto either a viewing screen or the copier plane of a copier. A servomechanism is provided for each of the movements of the microform holder as well as the positioning of any one of the lens systems in the nodal plane.

10 Claims, 3 Drawing Figures

3,640,621

VIEWER-PROJECTOR-COPIER APPARATUS FOR MICROFORMS

BACKGROUND OF THE INVENTION

The present invention relates to viewer-projector-copier apparatus for microforms.

The term microform is used herein as a generic term and includes all photographic documentation, for example microfilm and microfiche, in which the format of the documents may or may not be standardized and on which microimages of one or more documents having the same of different formats may be provided. Such microforms can be of the type used in office work wherein perforations or the like are provided thereon for automatically designating the desired operations to be carried out thereon. The invention is however more directly concerned with use of a standardized microform having a 105×150 mm. format which can be subdivided into up to 60 or 64 subdivisions each of which is capable of carrying the image of two pages of text, i.e., a total of 120 or 128 pages per microform. However, it is also possible to use the entire microform the so-called N1 format, without any subdivisions for example for use in reproducing a document of great dimensions.

In recent years, the use of microforms of this type has been developed without a corresponding development in viewer-copiers for exploiting the use of such documentation. There does not appear to exist at this moment a commercial apparatus which permits the utilization of such microforms in which numerous distributions of microimages over the 105×150 format are possible.

SUMMARY OF THE INVENTION

One aspect of the invention consists in a viewer-projector-copier which carries out simply and economically the viewing, projecting and copying operations on a variety of microform formats to produce an image of a predetermined format with a single light source. In other words it is an object of the present invention to provide a viewer-projector-photocopier which is of a universal character with regard to the utilization of such microforms.

Another aspect of the invention is the automatic operation of such a viewer-projector-copier by means of programming, for example, with a punched paper or a magnetic tape.

A microform viewer-projector-copier according to the invention comprises a source of light providing a conical light beam, a microform holder for supporting a microform having at least one microimage, a light condenser located downstream of the light source and upstream of the microform for concentrating the light beam onto a predetermined nodal plane, a plurality of lens systems disposed downstream of the microform, a movable reflecting means disposed downstream of the lens systems having a first position for directing the light beam on a viewing screen and a second position for enabling the light beam to reach the copier plane of a copier, means for adjusting the position of the microform holder along the axis of the light beam for adjusting the illuminated portion of the microform from the entirety of the microform to the smallest microimage disposed on the microform, and means for positioning any one of the lens systems in said nodal plane for focusing the image of the illuminated portion of the microform whereby the resultant image formed on either the viewing screen or the copier plane is of both constant light intensity and format.

According to such an arrangement, an image of a constant and predetermined format is produced regardless of the formats of the microforms that are employed. Further, the light intensity of this image is uniformly maintained even for microform of a very large format with the single light source.

The light beam emerging from the condenser can be preferably made homogeneous by the use of a condenser including a double Fresnel lens system with a diffusion plate having plane parallel faces. Thus the regularity of the lighting value of the microform image produced can be improved irrespective of the format of the microimage to be viewed or copied and the position of the object-plane in the light beam.

Preferably, the apparatus according to the invention comprises a diffusion plate with a pair of parallel faces one of which is polished. Experience has shown that this feature which is both simple and economical, provides a diffusion plate which yields results that are entirely satisfactory in practice.

The microform holder for the apparatus comprises a support which is movable along the optical axis of the light beam, and a rotatable platform mounted on the support having an axis of rotation that coincides with the axis of the light beam. On the platform is disposed a so-called "X-Y" table including a first carriage movable in a first direction (X) and a second carriage mounted on the first carriage and movable in a direction (Y) perpendicular to that of the first carriage. By means of this arrangement in combination with the displacement of the movable support and the selection of an appropriate lens system, the choice of portion to be viewed, projected or copied is thus delimited by the illuminated portion. The displacements X and Y allow the positioning of a particular microimage relative to the rest of the microimages carried on the microform, whereas the rotation of the rotatable platform allows the positioning of the microimages lengthwise or crosswise. The conical light beam directed from the condenser onto the microform in the desired object-plane illuminates a variable surface corresponding to the focal point of the lens system chosen, from a minimum format or single microimage to a maximum format which may correspond to the entire surface of the microform.

Another aspect of the invention consists in providing a servomechanism for each of the following movements by each of the following movable elements: the movement of the microform holder along the axis of the light beam, the rotational movement of the platform, the movement of the first carriage, the movement of the second carriage, and the rotational movement of the turret for bringing one of the lens systems into position; wherein each of the servomechanisms comprises a potentiometer having a sliding contact connected for movement with one of the movable elements, a motor for driving the movable element, a plurality of preset resistances, means for selecting at least one of the preset resistances, a comparator for comparing the difference between a selected preset resistance and the resistance of the potentiometer and thus effecting an input to the motor for moving the movable element to the desired position.

The apparatus can advantageously be devised so that the various movements and adjustment operations can be effected automatically according to a predetermined program which would permit the use of the apparatus, for example, to copy without supervision at night.

With an arrangement of the type which is hereinabove described, such an automatic control comprises the following determinations according to such a programmed control:

a. determining the format of the image produced by operating a selector for choosing one of a group of lens systems as well as for determining the axial position of the object-plane relative to the light beam;

b. determining the microimage or the portion of the microform by the simultaneous positioning of the carriages X and Y; and c. determining the orientation of the object on the rotatable platform by orienting the object in one or the other of two angular positions perpendicular to one another, i.e., in all a total of five positioning movements.

In the case of copying, the above-described automatic control of the five movements will be completed by a command to the copier associated with the apparatus in a suitable manner. Such a command obviously includes the indication of the number of copies that are desired, the feeding of paper or other substrate into position after each copying cycle, the control of the shutter and the ejection of the paper for developing and then for storing and/or classification.

BRIEF DESCRIPTION OF THE DRAWINGS

Further objects and advantages of the invention will be brought out in the description of an embodiment according to the invention which follows by way of example with reference to the accompanying drawings wherein.

DESCRIPTION OF THE PREFERRED EMBODIMENT

Figure 1:
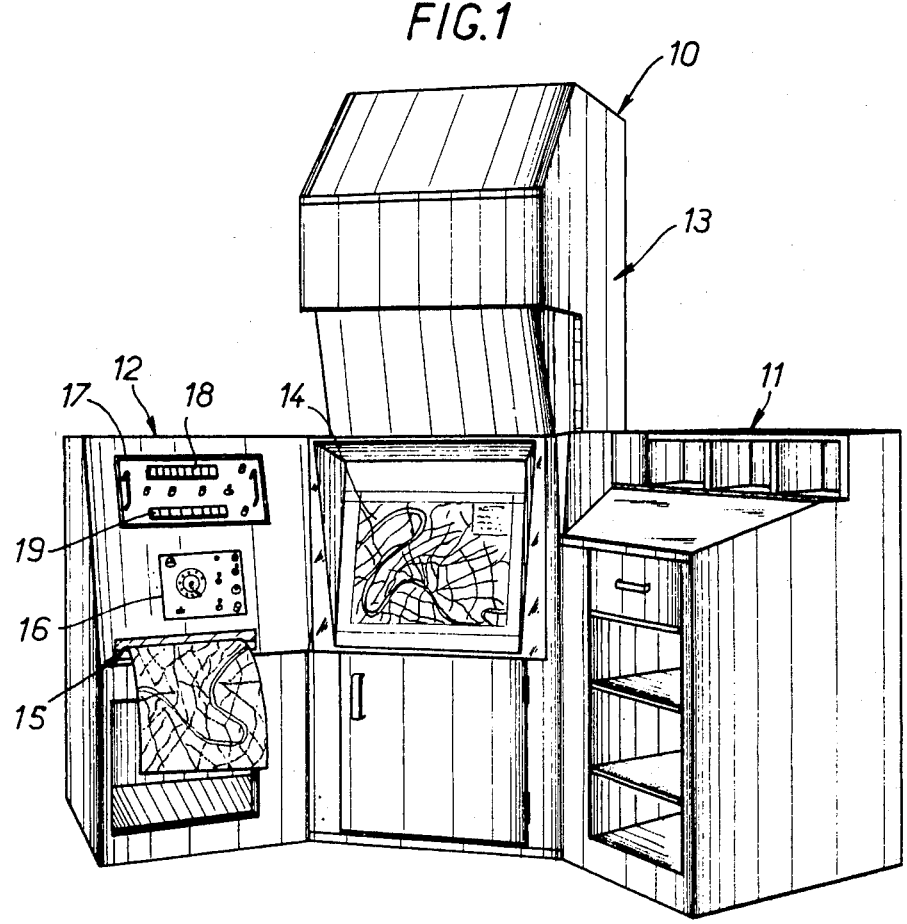
FIG. 1 is a perspective view of an apparatus according to the invention.

Referring now to the embodiment shown in FIG. 1, the apparatus is housed in a central housing 10 flanked by two movable lateral housings 11 and 12. The upper portion of the central housing 10 includes, as will be seen hereinbelow in greater detail, a light box, a viewing screen which is shown at 14 and a door which is disposed below this screen and which gives access to the copying section of the apparatus which is also accessible from either side of the central housing by moving the lateral housings 11 and 12. The housing 11 is formed as a desk at which the materials to be reproduced, microforms, can be prepared as well as other auxiliary functions relative thereto. The housing 12 is a control desk as well as the position at which the finished copies are made available as they are passed out of the apparatus through the slot 15. The general controls for the copying and the signaling are disposed on a control panel 16 above the slot 15. A second control panel 17 is disposed above the control panel 16 and on which is located the automatic controls in particular two rows of pushbuttons 18 and 19.

Figure 2:
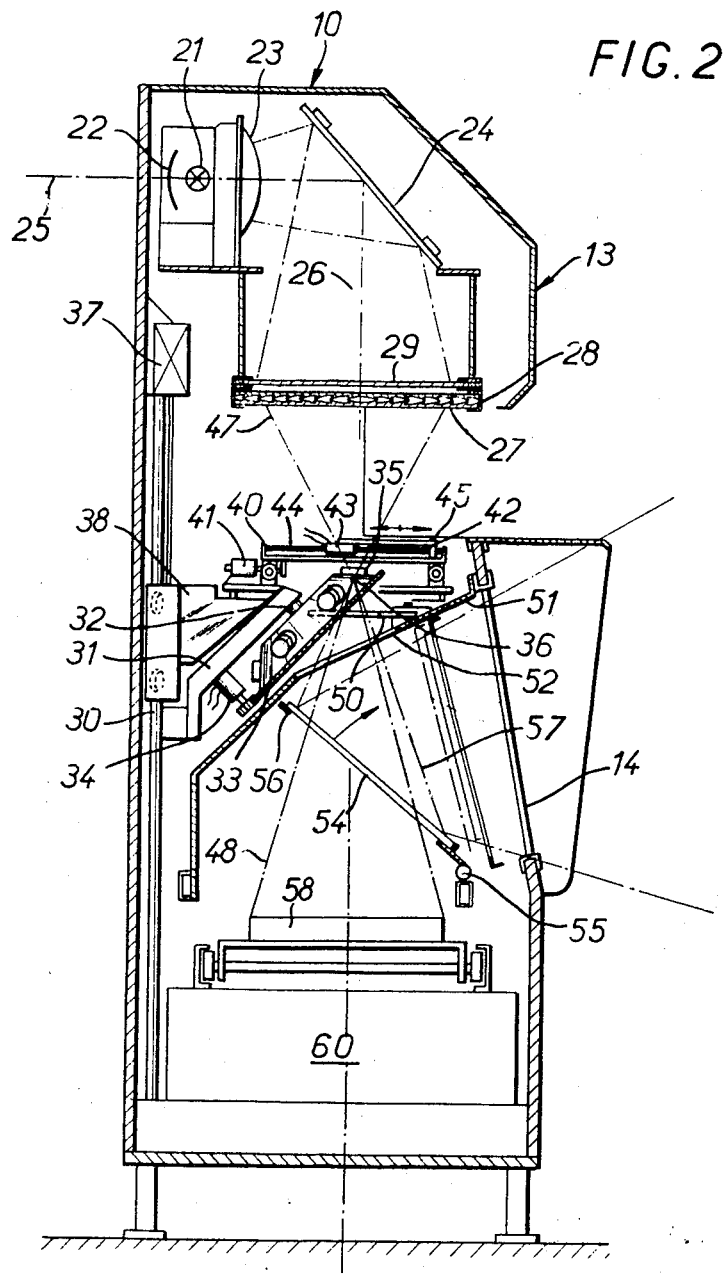
FIG. 2 is a schematic elevation in section taken along a plane through the optical axis of the apparatus shown in FIG. 1.

Referring next to FIG. 2 which is a vertical section of the central housing 10 in which the light beam 13 including a spherical reflector 22 and a plane-convex lens 23 are disposed. A mirror 24 is inclined at an angle of 45° relative to the horizontal axis 25 of the incident beam; this beam is reflected along a vertical axis 26 onto a condenser 27. This condenser comprises a pair of Fresnel lenses whose annular lenticular surfaces face one another. A frame is provided for supporting the pair of Fresnel lenses as well as for carrying a diffusion plate 29 which comprises a plate with parallel faces one of which is polished.

A vertical frame extending along the back of the housing 10 supports an optical assembly with an axis inclined at 45° on which a turret 33 rotates and is operated by an electric motor 34. The turret 33 carries a series of lens systems having different focal lengths, any one of these lens systems can be brought into operative position along the optical axis 26 by rotating the turret to the desired position. In FIG. 2 the lens system 35 is located in position along the optical axis 26.

A microform holder assembly including a support 38 is slidably mounted along the frame 30 by means of a motor 37. This support carries a platform 40 which can be positioned about an axis which coincides with the optical axis 26 by means of another motor 41. A first carriage 42 hereinafter called carriage X, is arranged to be driven by a motor 43 along a rectilinear guide 44 extending along the diameter of the platform 40. A second carriage 45 hereinafter called carriage Y is movable on the first carriage by a motor (not shown) along a guide disposed perpendicular to the guide 44.

The lens systems 35 are mounted on the turret 33 in such a manner so that when one of them is brought into operative position, the center of its pupil is located on the optical axis 26 at a predetermined focal plane at the point of convergence 36 of the beam emanating from the condenser 27.

The carriage Y includes or carries microform holder carriage (not shown) which is adapted to receive the material to be scanned, for example a microform whose format is 105×150 mm.

The beam 48 is directed from the lens system across a shutter 50 to the upper face of a cover 51 and then across a window disposed in the said cover 51 for this purpose. The beam is then directed to a mirror 54 pivotally mounted along the horizontal axis 55 which is operable by a motor (not shown). The mirror 54 is shown in FIG. 2 in its operative position in which the end of the mirror 54 remote from the pivot 55 is in contact with a stop 56, in this position, the beam from the lens system 35 can be directed on the viewing screen. The mirror 54 is retractable to a position indicated in chain-dotted lines at 57; in this position the mirror is out range of the beam 48 and also functions to cover over the window in which is located the viewing screen 14 thus preventing the passage of light. When the mirror is in its retracted position, the beam 48 is directed onto the copying plane 58 in which is disposed an element of the copier section of the apparatus 60, for example paper or the like having a surface sensitive to the light beam 48.

The retractable mirror 54 is normally maintained in its solid line position and is automatically returned to this position from the chain-dotted line position in the absence of a signal ordering copying. As can be seen in FIG. 2, the distances between the nodal point of the lens system 36 and the screen 14 on the copying plane 58 are equal; therefore, the format of the image formed by the lens system 35 on either the screen 14 or the copying plane 58 is the same. The screen 14 is removable so that when the beam is reflected by the mirror 54 it can be viewed at a distance away from the apparatus on another screen.

The operation of the device according to the invention will now be described.

The microform is first placed in the carriage Y 45. The portion of the object that is to be scanned is then chosen by selecting the appropriate lens system by rotating the turret to position in which the lens system is positioned in the light beam. At the same time that the corresponding lens system is brought into position, the support 38 is displaced along the frame 30 to the position in which the conical beam is intercepted on the viewing screen at the predetermined format. The portion of the image to be viewed on the screen or reproduced by the copier can then be determined by the simultaneous positioning of the carriage X 42 and the carriage Y 45.

The orientation of the position of the object to be viewed can then be effected by the rotational movement of the platform. In general, this will be a choice between two positions perpendicular to one another so that the image can be presented lengthwise or crosswise.

The operations indicated hereinabove require a total of five movements and each of which requires a motor.

Figure 3:
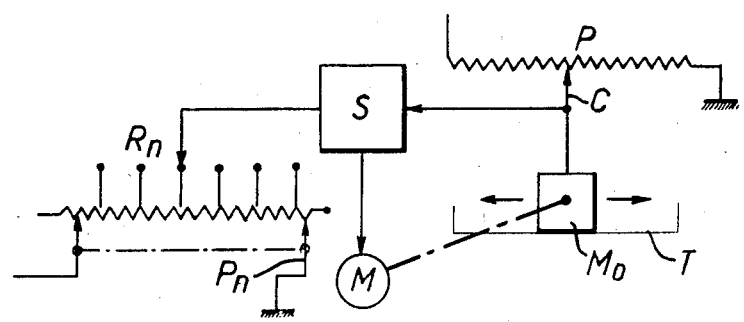
FIG. 3 is a diagram showing the principal of operation of the servomechanism according to the invention.

Each of these five movements is preferably controlled by a single servomechanism of the type shown in FIG. 3 which comprises a potentiometer P including a sliding contact connected for movement with a movable element corresponding to one of the five movements Mo which is adapted to be displaced by a motor M along a certain track T which may be curved or rectilinear. The motor M is controlled by a comparator S sensitive to the difference between the value of resistance effected by the position of the sliding contact of the potentiometer and the value of the selected preset resistance $Rn$ which can be chosen by means of a selector Se amongst a plurality of presettable resistances. A potentiometer can be provided with the above-described combination or can be provided with each of the preset resistances in order to manually regulate or adjust the position that is eventually reached.

The advantage of the use of this type of servocontrol for controlling the position of a movable element resides in the ease in which each any of the five movements can be chosen and indicated by choosing the appropriate preset resistance. These choices are permitted by the two rows of pushbuttons 18 and 19 (FIG. 1) of the second panel, which could also carry a series of selector relays such as the combination of the electronic part of the servocontrols S.

It is easy to see that a combination such as shown hereinabove lends itself very easily to automatic control by means of a program on punched paper or magnetic tape; the recorded commands on such tapes would be substituted for the manual selection by means of the pushbuttons 18 and 19. These recorded commands will be completed by the control signals that will be necessary to the operations as follows:

- the introduction and removal of microforms to and from the microform holder;
- the control the shutter 50 after the mirror 54 has been retracted;
- the changing or preparing the sensitive surface and all associated copying operations which may be varied according to the needs of the particular copier section chosen.

In the case of use of the projector for a lecture or for classroom work, it is easy to provide at any given moment a copy or copies of part or all of a particular document. All that is necessary is that the mode of the device be changed from that of a projector to that of a copier and the desired number copies be chosen.

We claim:

1. A microform viewer-projector-copier comprising a source of light providing a conical light beam, a microform holder for supporting a microform having at least one microimage, a light condenser located downstream of the light source and upstream of the microform for concentrating the light beam onto a predetermined nodal plane, a plurality of lens systems disposed downstream of the microform a movable reflecting means disposed downstream of the lens systems having a first position for directing the light beam on a viewing screen and a second position for enabling the light beam to reach the copier plane of a copier, means for adjusting the position of the microform holder along the axis of the light beam for adjusting the size of the illuminated portion of the microform from the entirety of the microform down to a portion equal in size to the smallest microimage disposed on the microform, and means for positioning any one of the lens systems in said nodal plane for focusing the image of the illuminated portion of the microform whereby the resultant image formed on either the viewing screen or the copier plane is of both constant light intensity and format.

2. A microform viewer-projector-copier as claimed in claim 1, wherein the light condenser includes a pair of Fresnel lenses arranged with the annular lenticular surfaces facing one another.

3. A microform viewer-projector-copier as claimed in claim 1, wherein means are provided upstream of the microform for homogenizing the light beam.

4. A microform viewer-projector-copier as claimed in claim 3, wherein the means is a diffusion plate and is arranged upstream of the light condenser.

5. A microform viewer-projector-copier as claimed in claim 1, wherein the microform holder is mounted on a support for movement along the axis of the light beam, a rotatable platform being provided on the support, the axis of rotation of the platform coinciding with the axis of the light beam, a pair of carriages being mounted on the platform, one of the carriages being adapted for movement in a first direction and the other carriage being adapted for movement in a second direction substantially perpendicular to that of the first.

6. A microform viewer-projector-copier as claimed in claim 5, wherein the lens systems are mounted on a rotatable turret, and means are provided for rotating the turret to position any one of the lens systems to coincide with said nodal plane.

7. A microform viewer-projector-copier as claimed in claim 6 wherein means are provided for rotating the rotatable platform to each of two positions disposed substantially perpendicular to one another.

8. A microform viewer-projector-copier as claimed in claim 7, wherein a servomechanism is provided for each of the following movements by each of the following movable elements: the movement of the microform holder along the axis of the light beam, the rotational movement of the platform, the movement of the first carriage, the movement of the second carriage, and the rotational movement of the turret for bringing one of the lens systems into position.

9. A microform viewer-projector-copier as claimed in claim 8, wherein each of the servomechanisms comprises a potentiometer having a sliding contact connected for movement with one of the movable elements, a motor for driving the movable element, a plurality of preset resistances, means for selecting at least one of the preset resistances, a comparator for comparing the difference between a selected preset resistance and the resistance of the potentiometer and thus effecting an input to the motor for moving the movable element to the desired position.

10. A microform viewer-projector-copier as claimed in claim 9, wherein programming means are providing for automatically operating the servomechanism and thereby effecting the displacement of the movable elements to their desired position.

* * * * *